United States Patent [19]

Blount

[11] 4,346,180

[45] Aug. 24, 1982

[54] PROCESS FOR THE PRODUCTION OF ORGANIC ALKALI METAL SILICATE COMPOUNDS

[76] Inventor: David H. Blount, 5450 Lea St., San Diego, Calif. 92105

[21] Appl. No.: 329,405

[22] Filed: Dec. 10, 1981

Related U.S. Application Data

[60] Division of Ser. No. 251,132, Apr. 6, 1981, Pat. No. 4,321,184, which is a continuation-in-part of Ser. No. 146,474, May 5, 1980, Pat. No. 4,273,908, which is a continuation-in-part of Ser. No. 889,932, Mar. 27, 1978, abandoned, which is a continuation-in-part of Ser. No. 663,924, Mar. 4, 1976, Pat. No. 4,097,424, which is a continuation-in-part of Ser. No. 599,000, Jul. 7, 1975, Pat. No. 4,073,637, which is a continuation-in-part of Ser. No. 262,485, Jun. 14, 1972, abandoned, which is a continuation-in-part of Ser. No. 71,628, Sep. 11, 1970, abandoned.

[51] Int. Cl.$^3$ .............................................. C08J 9/00
[52] U.S. Cl. .................................. 521/100; 521/107; 521/128; 521/130; 521/154; 521/155; 521/168; 524/788; 524/859; 524/868; 524/869; 528/44; 528/71; 528/73; 556/400; 556/413; 556/427; 556/437; 556/467
[58] Field of Search ............... 521/100, 107, 128, 130, 521/154, 155, 168; 524/788, 859, 868, 867; 528/44, 71, 73; 556/400, 413, 427, 437, 467

[56] References Cited

U.S. PATENT DOCUMENTS

| | | | |
|---|---|---|---|
| 4,107,140 | 8/1978 | Blount | 521/154 |
| 4,139,549 | 2/1979 | Blount | 521/154 |
| 4,198,491 | 4/1980 | Blount | 525/61 |
| 4,321,184 | 3/1982 | Blount | 528/373 |

*Primary Examiner*—Morton Foelak

[57] ABSTRACT

An oxidated silicon compound will react with a substituted organic compound in the presence of an alkali compound to produce organic alkali metal silicate products which may be used as molding powders, as adhesives, as coating agents and be reacted with polyisocyanates to produce insulating foams.

9 Claims, No Drawings

PROCESS FOR THE PRODUCTION OF ORGANIC ALKALI METAL SILICATE COMPOUNDS

CROSS-REFERENCE TO RELATED APPLICATION

This application is a divisional of U.S. Patent application Ser. No. 251,132, filed Apr. 6, 1981, now U.S. Pat. No. 4,321,184, which is a continuation-in-part of U.S. Patent application, Ser. No. 146,474, filed May 5, 1980, now U.S. Pat. No. 4,273,908, which is a continuation-in-part of continuation-in-part of my U.S. Patent application, Ser. No. 889,932, filed Mar. 27, 1978, now abandoned which is a continuation-in-part of my earlier U.S. Patent application, Ser. No. 663,924, filed Mar. 4, 1976, now U.S. Pat. No. 4,097,424 which is a continuation-in-part of my earlier U.S. Patent application, Ser. No. 599,000, filed July 7, 1975, now U.S. Pat. No. 4,073,637, which is a continuation-in-part of my earlier U.S. Patent application, Ser. No. 262,485, filed June 14, 1972, now abandoned, which is a continuation-in-part of my earlier U.S. Patent application, Ser. No. 71,628, filed Sept. 11, 1970, now abandoned.

BACKGROUND OF THE INVENTION

This invention relates to a process for the production of organic alkali metal silicate compounds by reacting a substituted organic compound with an oxidized silicon compound in the presence of an alkali compound such as alkali metal hydroxide, or alkali metal carbonates; or it may be mixed with alkaline earth metal hydroxide, alkaline earth metal carbonates and mixtures thereof.

The novel organic alkali metal silicate compounds may be further reacted with a salt-forming compound to produce organic silicate compounds.

The novel organic alkali metal silicate compounds and resinous products are very useful as intermediaries in the production of compounds and resinous products. The organic alkali metal silicate compounds and resinous products will react chemically with aldehydes, organic dicarboxylic acids and anhydrides, cyanide, silicon halides, epihalohydrins, epoxides, polyepoxy compounds and resins, halohydrins, isocyanate compounds, polyisocyanate compounds, polyurethane prepolymers, polyisocyanate silicate prepolymers, silicon acid halides, ketones, organic dienes, vinyl monomers and allyl halides and mixtures thereof.

The organic alkali metal silicate resinous products may be utilized as molding material, as adhesives, as coating agents, as putties, as caulking agents, and may be used to produce foams which may be used for thermal and sound insulation, packaging, coating agents, etc.

Organic alkali metal silicate compounds are produced by reacting the following components:
A. oxidated silicon compound;
B. an alkali compound;
C. an organic compound which is attached to a substituent which will split off during the reaction.

Organic silicate compounds and resinous products are produced by adding the following components:
D. salt-forming compound;
E. organic epoxide compound;
F. polyisocyanate.

COMPONENT A

Any suitable oxidated silicon compound may be used in this invention. Suitable oxidated silicon compounds include, but are nor limited to, silica, e.g., hydrated silica, silicoformic acid (hydrated silica containing Si-H radicals), natural oxidated silicon compounds containing free silicic acid radicals, alkali metal silicates, e.g., sodium silicate, potassium silicate and lithium silicate, alkaline earth silicates, e.g., calcium silicate.

Sodium silicate is the preferred oxidated silicon compound. It is also preferred to use sodium silicate or sodium hydroxide with the alkaline earth silicates.

COMPONENT B

Any suitable alkali compound may be used in this invention. Suitable alkali compounds include alkali metal hydroxides, e.g., sodium hydroxide and potassium hydroxide, alkali metal carbonates, e.g., sodium carbonate and potassium carbonate, alkaline earth metal hydroxides such as calcium hydroxide, alkaline earth metal carbonates such as calcium carbonate and mixtures thereof.

Sodium hydroxide is the preferred alkali metal compound. When an alkaline earth hydroxide or carbonate is utilized, it is preferred to use them with sodium hydroxide. It is preferable to use alkali metal carbonates only when the substituent is a halide or hydrogen sulfate radical.

COMPONENT C

Any suitable organic compound which is attached to a substituent which will split off during the reaction may be used in this invention. A suitable organic compound may contain one or more substituents and may be saturated or unsaturated hydrocarbon. An organic compound is preferred, having a substituent which splits off during the reaction. These organic compounds which are the reactants used in the preparation of broken-down organic lignin-cellulose polymers have the graphical skeleton carbon structure of

where X represents the substituents which split off during the reaction. The R, R' and R" are selected from the following groups: hydrogen, saturated straight-chain carbon atoms, unsaturated carbon atoms, ether linkages, aromatic structures, another X and others, for it is to be understood that other structures may be employed. The X substituents can be halogen, acid sulfate, nitrate, acid phosphate, bicarbonate, sulfate formate, acetate, propionate, laurate, oleate, stearate, acid oxalate, acid malonate, acid tartrate, acid citrate, mixtures thereof and others.

Suitable substituted organic compounds include, but are not limited to, substituted alkyl compounds such as methyl halides such as methyl chloride, methyl bromide, methyl iodide, etc., methyl sulfate, methyl hydrogen sulfate, methyl hydrogen phosphate, methyl nitrate; ethyl halides such as ethyl chloride, ethyl bromide, ethyl iodide, etc., ethyl hydrogen sulfate, ethyl sulfate, ethyl hydrogen phosphate, ethyl nitrate, ethyl oxalate; propyl halides, propyl hydrogen sulfate, 1-nitropropane, 2-nitropropane, propyl hydrogen phosphate; butyl halides, butyl hydrogen sulfate, 2-nitro-1-butanol, butyl hydrogen phosphate, etc.; substituted unsaturated comppounds such as vinyl chloride, vinyl bromide, vinyl acetate, vinylidine chloride; substituted carboxylic acids such as chloroacetic acid, dichloroacetic acid sodium chloroacetate, bromoacetic acid, iodoacetic acid, γ-chloropropionic acid, γ-chlorobutyric acid, etc.; acid chlorides such as acetyl chloride, ecetyl bromide, propionyl chloride, n-butyryl chloride, chloroacetic chloride, etc.; carboxyl acid anhydrides such as acetic anhydride, propionic anhydride, n-butyric anhydride, isobutyric anhydride, etc., organic esters such as ethyl acetate, methyl propionate, propyl formate, methyl formate, ethyl formate, methyl acetate, n-butyl acetate, ethyl chloroacetate, etc.; substituted benzene compounds such as benzyl chloride, benzyl chloride nitrobenzene, and p-chlorobenzoic acid, etc.

Polysubstituted organic compounds which are used in this invention to produce organic alkali metal silicate compounds have the graphical skeleton carbon structure of

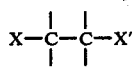

where

represents two adjacent carbon atoms, or

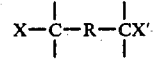

where X and X' represent the substituents which split off during the reaction. The R between the pair of reactive carbon atoms is selected from the following groups: saturated straightchain carbon atoms, unsaturated carbon atoms, ether linkages, aromatic structures, and others, for it is to be understood that other intervening structures may be employed. The X and X' substituents can be halogen, acid sulfate, nitrate, acid phosphate, bicarbonate, formate, acetate, propionate, laurate, oleate, stearate, oxalate, acid malonate, acid tartrate, acid citrate and others. Examples of these organic compounds include, but are not limited to:

| | |
|---|---|
| $CH_3CHXOCHX'CH_3$ | AA' disubstituted ethyl ether; |
| $XC_2H_4OC_2H_4X'$ | BB' disubstituted ethyl ether; |
| $XCH_2OCH_2X'$ | Disubstituted methyl ether; |
| $XC_2H_4OC_2H_4OC_2H_4X'$ | Disubstituted ethoxy ethyl ether; |
| $XCH_2CH_2SCH_2CH_2X'$ | Disubstituted thio ethyl ether; |
| $XCH_2OCH_2\underset{\underset{CH_3}{\mid}}{\overset{\overset{CH_3}{\mid}}{C}}CH_2OCH_2X'$ | Disubstituted 1,3-methoxy-2,2-dimethyl propane; |
| $XCH_2CH_2CH_2OCH_2OCH_2CH_2CH_2X'$ | Disubstituted dipropyl formal; |
| $XCH_2CH_2O\langle\bigcirc\rangle OCH_2CH_2X'$ | Disubstituted para-diethoxy benzene; |
| $XCH_2OCH_2CHOCH_3$ | Disubstituted dimethoxy ethane; |
| $XCH_2CH_2O\overset{\overset{O}{\parallel}}{C}OCH_2CH_2X'$ | Disubstituted diethyl carbonate; |
| $XCH_2\overset{\overset{O}{\parallel}}{C}OCH_2CH_2O\overset{\overset{O}{\parallel}}{C}CH_2X'$ | Disubstituted glycol diacetate; |
| $X-\langle\bigcirc\rangle CH_2OCH_2\langle\bigcirc\rangle-X'$ | pp' disubstituted dibenzyl ether; |
| $X-\langle\bigcirc\rangle-O-\langle\bigcirc\rangle-X'$ | pp' disubstituted diphenyl ether; |
| $XCH_2CH_2SO_2CH_2CH_2X'$ | Disubstituted diethyl sulphone; |
| $CH_3CH_2\underset{\underset{X}{\mid}}{C}HO\underset{\underset{X'}{\mid}}{C}HCH_2CH_3$ | AA' disubstituted propyl ether; |
| $X\langle\bigcirc\rangle X'$ | Para disubstituted benzene; |
| $XCH_2\langle\bigcirc\rangle CH_2X'$ | Disubstituted para xylene; |

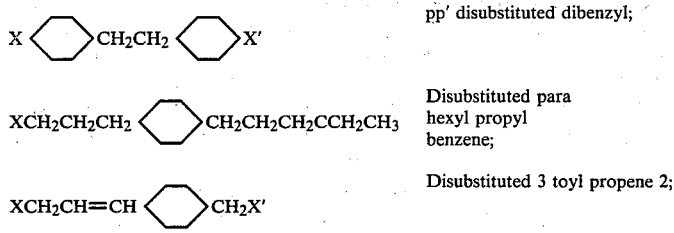

| | |
|---|---|
| | pp' disubstituted dibenzyl; |
| | Disubstituted para hexyl propyl benzene; |
| | Disubstituted 3 toyl propene 2; | and others such as methylene chloride or bromide, ethylene dichloride, ethylene dibromide, propylene dichloride or dibromide, dihalides of unsaturated hydrocarbon gases derived from pressure-cracking processes and natural gas-cracking processes as well as compounds having more than two substituents such as 1,1,2-trichloroethane; 1,2,4-trichlorobutane; 1,2,3,4-tetrachlorobutane; trichloromesitylene and the like. Mixtures of these compounds may be used in this process.

The primary object of this invention is to produce novel organic alkali metal silicate compounds. Another object is to produce organic silicate compounds. Still another object is to produce organic alkali metal silicate compounds which will react with polyisocyanates to produce useful foam which may be used for thermal or sound insulation. Still another object is to produce organic silicate compounds which will react with polyisocyanates to produce useful foams which may be used as construction components and for sound and thermal insulation. Still another object is to produce organic alkali metal silicate compounds which will react with halohydrins, epihalohydrins, vinyl monomers, allyl halides, polycarboxylic acids and polyhydroxyl compounds and mixtures thereof to produce useful resinous products.

DETAILED DESCRIPTION OF THE INVENTION

The preferred process to produce organic alkali metal silicate compounds is to mix and react 50 to 100 parts by weight of an oxidated compound, 50 to 100 parts by weight of an alkali metal compound in an aqueous solution and an organic compound which is attached to a substituent which will split off during the reaction in an amount wherein the substituted radicals are about equal to the alkali metal radicals. The mixture is agitated at a suitable temperature and pressure for 1 to 12 hours, thereby producing a mixture of organic alkali metal silicate compounds. There is a mixture of mono-organic alkali metal silicate compounds and di-organic alkali metal silicate compounds. An emulsifier or surfactants may be utilized to assist in mixing the components.

The chemical reaction of this invention may take place in any suitable physical condition. Ambient pressure is usually satisfactory, but in certain conditions, an elevated or below-ambient pressure may be useful. In cases when halogenated organic compounds are used, the reaction is speeded up by increased temperature (up to 200° C.) and pressure (up to 1500 psi). When organic hydrogen sulfate compounds are used, it may be necessary to decrease the temperature by cooling the reactants. Ambient temperature is usually satisfactory.

Any suitable salt-forming compound may be used in this invention to react with the organic alkali metal silicate compounds to produce organic silicate compounds and salt. Suitable salt-forming compounds include mineral acids such as hydrochloric acid, sulfuric acid and nitric acid, organic acid such as acetic acid, propionic acid, etc., and hydrogen-containing acid salts such as sodium hydrogen sulfate, potassium hydrogen sulfate, sodium dihydrogen phosphate and potassium sihydrogen phosphate, and mixtures thereof. The salt-forming compound is added to the organic-alkali metal silicate compounds until the pH is 6 to 8. The salt may be removed by washing with water, filtering off the water and salt, then drying.

The organic silicate compounds will react with polyisocyanates such as crude MDI to produce resinous products which may be used as adhesives, putty caulking agents, etc., and foams which may be used for thermal and sound insulation.

Any suitable organic polyisocyanate may be used according to the invention, including aliphatic, cycloaliphatic, araliphatic, aromatic and heterocyclic polyisocyanates and mixtures thereof. Suitable polyisocyanates which may be employed in the process of the invention are exemplified by the organic diisocyanates which are compounds of the general formula:

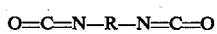

wherein R is a divalent organic radical such as an alkylene, aralkylene or arylene radical. Such suitable radicals may contain, for example, 2 to 20 carbon atoms. Examples of such diisocyanates are:
tolylene diisocyanate,
p,p'-diphenylmethane diisocyanate,
phenylene diisocyanate,
m-xylylene diisocyanate,
chlorophenylene diisocyanate,
benzidene diisocyanate,
naphthylene diisocyanate,
decamethylene diisocyanate,
hexamethylene diisocyanate,
pentamethylene diisocyanate,
tetramethylene diisocyanate,
thiodipropyl diisocyanate,
propylene diisocyanate, and
ethylene diisocyanate.

Other polyisocyanates, polyisothiocyanates and their derivatives may be equally employed. Fatty diisocyanates are also suitable and have the general formula:

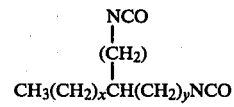

where x+y totals 6 to 22 and z is 0 to 2, e.g., isocyanastearyl isocyanate.

It is generally preferred to use commercially readily-available polyisocyanates, e.g., tolylene-2,4- and -2,6- diisocyanate and any mixtures of these isomers ("TDI"), polyphenylpolymethylene-isocyanates obtained by aniline-formaldehyde condensation followed by phosgenation ("crude MDI"), and modified polyisocyanate containing carbodiimide groups, allophanate groups, isocyanurate groups, urea groups, imide groups, amide groups or bioret groups, said modified polyisocyanates prepared by modified polyisocyanates prepared by modifying organic polyisocyanates thermally or catalytically by air, water, urethanes, alcohols, amides, amines, carboxylic acids, or carboxylic acid anhydrides, phosgenation products of condensates or aniline or anilines alkyl-substituted on the nucleus, oraldehydes. Ketones may be used in this invention. Solutions of distillation residues accumulating during the production of tolylene diisocyanates, diphenyl methane diisocyanates, or hexamethylene diisocyanate, in monomeric polyisocyanates or in organic solvents or mixtures thereof may be used in this invention. Organic triisocyanates such as triphenylmethane triisocyanate may be used in this invention. Cycloaliphatic polyisocyanates, e.g., cyclohexylene-1,2-; cyclohexylene-1,4-; and methylene-bis-(cyclohexyl-4,4'-) diisocyanate may be used in this invention. Suitable polyisocyanates which may be used according to the invention are described by W. Siefkin in Justus Liebigs Annalen der Chemie, 562, pages 75 to 136. Inorganic polyisocyanates are also suitable according to the invention.

Organic polyhydroxyl compounds (polyols) may be used in this invention with polyisocyanates or may be first reacted with a polyisocyanate to produce isocyanate-terminated polyurethane prepolymers and then also be used in this invention.

Reaction products of from 50 to 99 mols of aromatic diisocyanates with from 1 to 50 mols of conventional organic compounds with a molecular weight of, generally, from about 200 to about 10,000 which contain at least two hydrogen atoms capable of reacting with isocyanates, may also be used. While compounds which contain amino groups, thiol groups, carboxyl groups or silicate groups may be used, it is preferred to use organic polyhydroxyl compounds, in particular, compounds which contain from 2 to 8 hydroxyl groups, especially those with a molecular weight of from about 800 to about 10,000 and, preferably, from about 1,000 to about 6,000, e.g., polyesters, polyethers, polythioethers, polyacetals, polycarbonates or polyester amides containing at least 2, generally from 2 to 8, but, preferably, dihydric alcohols, with the optional addition of trihydric alcohols, and polybasic, preferably dibasic, carboxylic acids. Instead of the free polycarboxylic acids, the corresponding polycarboxylic acid anhydrides or corresponding polycarboxylic acid esters of lower alcohols or their mixtures may be used for preparing the polyesters. The polycarboxylic acid may be aliphatic, cycloaliphatic, aromatic and/or heterocyclic and may be substituted, e.g., with halogen atoms and may be unsaturated. Examples include: succinic acid, adipic acid, sebacic acid, suberic acid, azelaic acid, phthalic acid, phthalic acid anhydride, isophthalic acid, tetrahydrophthalic acid anhydride, trimellitic acid, hexahydrophthalic acid anhydride, tetrachlorophthalic acid anhydride, endomethylene tetrahydrophthalic acid anhydride, glutaric acid anhydride, fumaric acid, maleic acid, maleic acid anhydride, dimeric and trimeric fatty acid such as oleic acid, optionally mixed with monomeric fatty acids, dimethylterephthalate and bis-glycol terephthalate. Any suitable polyhydric alcohol may be used, such as, for example, ethylene glycol, propylene-1,2- and -1,3-glycol; butylene-1,4- and -2,3-glycol; hexane-1,6-diol; octane-1,8-diol; neopentyl glycol; cyclohexanedimethanol-(1,4-bis-hydroxymethylcyclohexane); 2-methylpropane-1,3-diol; glycerol; trimethylol propane; hexane-1,2,6-triol; butane-1,2,4-triol; trimethylol ethane; pentaerythritol; quinitol; mannitol and sorbitol; methylglycoside; diethylene glycol; triethylene glycol; tetra ethylene glycol; polyethylene glycols; dipropylene glycol; polypropylene glycols; dibutylene glycol and polybutylene glycols. The polyesters may also contain a proportion of carboxyl end groups. Polyesters of lactones, such as c-caprolactone, or hydroxycarboxylic acid such as c-hydroxycaproic acid, may also be used.

The polyethers with at least 2, generally from 2 to 8 and, preferably, 2 or 3, hydroxyl groups used according to the invention are known and may be prepared, e.g., by the polymerization of epoxides, e.g., ethylene oxide, propylene oxide, butylene oxide, tetrahydrofurane oxide, styrene oxide or epichlorohydrin, each with itself, e.g., in the presence of $BF_3$ or by addition of these epoxides, optionally as mixtures or successively, to starting components which contain reactive hydrogen atoms such as alcohols or amines, e.g., water, ethylene glycol; propylene-1,3- or -1,2-glycol; trimethylol propane; 4,4'-dihydroxydiphenylpropane; aniline; ammonia, ethanolamine or ethylenediamine; sucrose polyethers, such as those described in German Auslegeschrifren Nos. 1,176,358 and 1,064,938, may also be used according to the invention. It is frequently preferred to use polyethers which contain, predominantly, primarily OH groups (up to 90% by weight, based on the total OH groups contained in the polyether). Polyethers modified with vinyl polymers such as those which may be obtained by polymerizing styrene or acrylonitrites in the presence of polyethers, (U.S. Pat. Nos. 3,383,351; 3,304,273; 3,523,093 and 3,110,695; and German Pat. No. 1,152,536) and polybutadienes which contain OH groups are also suitable.

By "polythioethers" are meant, in particular, the condensation products of thiodiglycol with itself and/or with other glycols, dicarboxylic acids, formaldehyde, aminocarboxylic acids or amino alcohols. The products obtained are polythio-mixed ethers or polythioether ester amides, depending on the cocomponent.

The polyacetals used may be, for example, the compounds which may be obtained from glycols, 4,4'-dihydroxydiphenylmethylmethane, hexanediol and formaldehyde. Polyacetals suitable for the invention may also be prepared by the polymerization of cyclic acetals.

The polycarbonates with hydroxyl groups used may be of the kind, e.g., which may be prepared by reaction diols, e.g., propane-1,3-diol; butane-1,4-diol; and/or hexane-1,6-diol or diethylene glycol, triethylene glycol or tetraethylene glycol, with diarylcarbonates, e.g., diphenylcarbonates or phosgene.

The polyester amides and polyamides include, e.g., the predominantly linear condensates obtained from polyvalent saturated and unsaturated carboxylic acids or their anhydrides, any polyvalent saturated and unsaturated amino alcohols, diamines, polyamines and mixtures thereof.

Polyhydroxyl compounds which contain urethane or urea groups, modified or unmodified natural polyols, e.g., castor oil, wood particles, cellulose, modified cellulose, carbohydrates and starches, may also be used. Additional products of alkylene oxides with phenol formaldehyde resins or with ureaformaldehyde resins are also suitable for the purpose of the invention.

Organic hydroxyl silicate compound as produced in U.S. Pat. No. 4,139,549 may also be used in this invention.

Examples of these compounds which are to be used according to the invention have been described in High Polymers, Volume XVI, "Polyurethanes, Chemistry and Technology", published by Saunders-Frisch Interscience Publishers, New York, London, Volume I, 1962, pages 32 to 42 and pages 44 to 54, and Volume II, 1964, pages 5 and 16 and pages 198 and 199; and in Kunststoff-Handbuch, Volume VII, Vieweg-Hochtlen, Carl-Hanser-Verlag, Munich, 1966, on pages 45 to 71.

If the polyisocyanates or the prepolymer which contains NCO groups have a viscosity above 2000 cP at 25° C., it may be advantageous to reduce the viscosity thereof by mixing it with a low-viscosity organic polyisocyanate and/or an inert blowing agent or solvent.

Inorganic polyisocyanates and isocyanate-terminated polyurethane silicate prepolymers may also be used in this invention.

Polyisocyanate curing agents and/or polyisocyanate activators (catalysts) may be used in the process of producing polyurethane resinous or formed products. The following are examples of polyisocyanate curing agents and activators:

1. Water
2. Water containing 10% to 70% by weight of an alkali metal silicate, such as sodium and/or potassium silicate. Crude commercial alkali metal silicate may contain other substances, e.g., calcium silicate, magnesium silicate, borates or aluminates, and may also be used. The molar ratio of alkali metal oxide to $SiO_2$ is not critical and may vary within the usual limits, but is preferably between 4 to 1 and 0.2 to 1.
3. Water containing 20% to 50% by weight of ammonium silicate.
4. Water containing 5% to 40% by weight of magnesium oxide in the form of a colloidal dispersion.
5. Alkali metal metasilicate such as sodium metasilicate, potassium metasilicate and commercial dry granular sodium and potassium silicates. Heating is required to start the curing reaction.
6. Water containing 20% to 70% by weight of silica sol.
7. Activators (catalysts) which act as curing agents and are added to the polyurethane silicate prepolymer in the amount of 0.001% to 10% by weight. They may be added in water.
    (a) Tertiary amines, e.g., triethylamine; tributylamine; N-methyl-morpholine; N,N,N',N'-tetramethylenediamine; 1,4-diazobicyclo(2,2,2)-octane; N-methyl-N'-dimethylaminoethyl piperazine; N,N-dimethylbenzylamine; bis(N,N-diethylaminoethyl)-adipate; N,N-diethylbenzylamine; pentamethyldiethylenetriamine; N,N-dimethylcyclohexylamine; N,N,N',N'-tetramethyl-1,3-butanediamine; N,N-dimethyl-beta-phenylethylamine; and 1,2-dimethylimidazole. Suitable tertiary amine activators which contain hydrogen atoms which are reactive with isocyanate groups include, e.g., triethanolamine; triisopanolamine; N,N-dimethylethanolamine; N-methyldiethanolamine; N-ethyldiethanolamine; and their reactive products with alkylene oxides, e.g., propylene oxide and/or ethylene oxide and mixtures thereof.
    (b) Organo-metallic compounds, preferably organo-tin compounds such as tin salts of carboxylic acid, e.g., tin acetate, tin octoate, tin ethyl hexoate, and tin laurate and the dialkyl tin salts of carboxylic acids, e.g., dibutyl tin diacetate, dibutyl tin dilaurate, dibutyl tin maleate or diocyl tin diacetate.
    (c) Silaamines with carbon-silicon bonds are described, e.g., in British Pat. No. 1,090,589, may also be used as activators, e.g., 2,2,4-trimethyl-1,2-silamorpholine or 1,3-diethylaminoethyl-tetramethyldisiloxane.
    (d) Other examples of catalysts which may be used according to the invention, and details of their action are described in Kunststoff-Handbuch, Volume VII, published by Vieweg and Hochtlen, Carl-Hanser-Verlag, Munich, 1966, on pages 96 and 102.
8. Water containing 1% to 10% by weight of bases which contain nitrogen such as tetraalkyl ammonium hydroxides.
9. Water containing 1% to 10% by weight of alkali metal hydroxides such as sodium hydroxide; alkali metal phenolates such as sodium phenolate or alkali metal alcoholates such as sodium methylate.
10. Water containing sodium polysulfide in the amount of 1% to 10% by weight.
11. Water containing 20% to 70% by weight of a water-binding agent, being capable of absorbing water to form a solid or a gel, such as hydraulic cement, synthetic anhydrite, gypsum or burnt lime.
12. Mixtures of the above-named curing agents.

Surface-active additives (emulsifiers and foam stabilizers) may also be used according to the invention. Suitable emulsifiers are, e.g., the sodium salts of ricinoleic sulphonates or of fatty acid, or salts of fatty acids with amines, e.g., oleic acid diethylamine or stearic acid diethanolamine. Other surface-active additives are alkali metal or ammonium salts of sulphonic acids, e.g., dodecylbenzine sulphonic acid or dinaphthyl methane disulphonic acid; or of fatty acids, e.g., ricinoleic acid, or of polymeric fatty acids.

The foam stabilizers used are mainly water-soluble polyester siloxanes. These compounds generally have a polydimethylsiloxane group attached to a copolymer of ethylene oxide and propylene oxide. Foam stabilizers of this kind have been described in U.S. Pat. No. 3,629,308. These additives are preferably used in quantities up to 20%, but, especially, 0.01% to 20%, by weight, based on the reaction mixture.

Negative catalysts, for example, substances which are acidic in reaction, e.g., hydrochloric acid or organic acid halides, known cell regulators, e.g., paraffins, fatty alcohols or dimethyl polysiloxanes, pigments or dyes, known flame-retarding agents, e.g., tris-chloroethylphosphate or ammonium phosphate and polyphosphates, stabilizers against aging and weathering, pesticizers, fungicidal and bacteriocidal substances and fillers, e.g., barium sulphate, kieselguhr, carbon black or whiting, may also be used according to the invention.

Further examples of surface additives, foam stabilizers, cell regulators, negative catalysts, stabilizers, flame-retarding substances, plasticizers, dyes, fillers and fungicidal and bacteriocidal substances, plus details about methods of using these additives and their action, may be found in Kunststoff-Handbuch, Volume VI, published by Vieweg and Hochtlen, Carl-Hanser-Verlag, Munich, 1966, on pages 103 to 113. The halogenated paraffins and inorganic salts of phosphoric acid are the preferred fire-retarding agents.

The preferred curing agent is an aqueous solution of silicates, sodium silicate and/or potassium silicate in water which is normally known as water glass. Aqueous solutions of silicates may be prepared in the form of 25% to 54% silicates. Silicon sols which may have an alkaline or acid pH may also be used; they should have solid contents of 15% to 50%. Silica sols are generally used in combination with aqueous silicate solutions. The choice of concentration depends mainly on the desired end product. Compact materials or materials with closed cells are, preferably, produced with concentrated silicated solutions which, if necessary, are adjusted to a lower viscosity by addition of alkali metal hydroxide. Solutions with concentrations of 40% to 70% by weight can be prepared in this way. On the other hand, to produce open-celled, lightweight foams, it is preferred to use silicate solutions with concentrations of 20% to 45% by weight in order to obtain low viscosities, sufficiently long reaction times and low unit weights. Silicate solutions with concentrations of 15% to 45% are also preferred when substantial quantities of finely divided inorganic fillers are used.

Suitable flame-resistant compounds may be used in the products of this invention such as those which contain halogen or phosphorus, e.g., tributylphosphate, tris(2,3-dichloropropyl)-phosphate; polyoxypropylene-chloromethylphosphonate; cresyldiphenylphosphate; tricresylphosphate; tris-(beta-chloroethyl)phosphate; tris-(2,3-dichloropropyl)-phosphate; triphenylphosphate; ammonium phosphate; perchlorinated diphenyl phosphate; perchlorinated terephenyl phosphate; hexabromocyclodecane; tribromophenol; dibromopropyldiene, hexabromobenzene; octabromodiphenylether; pentabromotoluol; polytribromostyrol, tris(bromocresyl)-phosphate; tetrabromobis-phenol A; tetrabromophthalic acid anhydride; octabromodiphenyl phosphate; tri-(dibromopropyl)-phosphate; calcium hydrogen phosphate; sodium or potassium dihydrogen phosphate; disodium or dipotassium hydrogenphosphate; ammonium chloride; phosphoric acid; polyvinylchloride tetomers chloroparaffins as well as further phosphorus- and/or halogen-containing flame-resistant compounds as they are described in Kunststoff-Handbuch, Volume VII, Munich, 1966, pages 110 to 111, which are incorporated herein by reference. The organic halogen-containing components are, however, preferred in the polyurethane products.

The ratio of the essential reactants and optional reactants which lead to the polyurethane silicate resinous or foamed product of this invention may vary, broadly speaking, with ranges as follows:

(a) 1 to 95 parts by weight of an organic alkali metal compound;
(b) 50 parts by weight of polyisocyanate or isocyanate-terminated polyurethane prepolymer;
(c) up to 20% by weight of a foam stabilizer;
(d) up to 50% by weight of a chemically inert blowing agent, boiling within the range of from $-25°$ C. to $80°$ C.;
(e) up to 10% by weight of an activator;
(f) up to 200 parts by weight of a water-binding agent;
(g) 1 to 95 parts by weight of a polyol;
(h) up to 100 parts by weight of a curing agent.

Percentages are based on the weight of the reactants.

In the cases where the viscosity of the polyisocyanate is too high, it may be reduced by adding a low-viscosity isocyanate, or even by adding inert solvents such as acetone, diethyl ether of diethylene glycol, ethyl acetate and the like.

In cases where the curing agent contains an aqueous alkali silicate, the isocyanate-terminated polyurethane prepolymer may be sulphonated. It is usually sufficient to react the isocyanate-terminated polyurethane prepolymer with concentrated sulphuric acid or oleum of sulfur trioxide in order to produce a sulphonated poly-(urethane silicate) prepolymer containing the sulphonic group in the amount of 3 to 100 milli-equivalents/100 g. The reaction will take place by thoroughly mixing the sulphuric acid or oleum or sulfur trioxide with the isocyanate-terminated polyurethane prepolymer at ambient temperature and pressure. In some cases where sulfur trioxide is used, an increased pressure is advantageous. The polyisocyanate may be modified to contain ionic groups before reacting with the polyester-silicate resinous products.

The sulphonated isocyanate-terminated polyurethane prepolymer can be directly mixed with an aqueous silicate solution, in which case the corresponding metal salt is formed in situ. The sulphonated poly(urethane silicate) prepolymer may be completely or partly neutralized at the onset by the addition of amines, metal alcoholates, metal oxides, metal hydroxide or metal carbonates.

Water-binding components may be used in this invention, including organic or inorganic water-binding substances which have, first, the ability to combine chemically, preferably irreversibly, with water and, second, the ability to reinforce the poly(urethane silicate) plastics of the invention. The term "water-binding component" is used herein to identify a material, preferably granular or particulate, which is sufficiently anhydrous to be capable of absorbing water to form a solid or gel such as mortar of hydraulic cement.

A water-binding component such as hydraulic cement, synthetic anhydrides, gypsum or burnt lime may be added to any of the components to produce a tough, somewhat flexible solid or cellular solid concrete. The water-binding component may be added in amounts up to 200% by weight, based on the weight of the reactants. When a water-binding agent is added and when the curing agent is an aqueous alkali metal silicate solution, a halogen- or phosphorous-containing compound or mixture thereof may be added in the amount of 1% to 30% by weight, based on the weight of the reactants.

Suitable hydraulic cements are, in particular, Portland cement, quick-setting cement, blast-furnace Portland cement, mild-burnt cement, sulphate-resistant cement, brick cement, natural cement, lime cement, gypsum cement, pozzolan cement and calcium sulphate cement. In general, any mixture of fine-ground lime, alumina and silica that will set to a hard product by admixture of water, which combines chemically with the other ingredients to form a hydrate, may be used. There are many kinds of cement which can be used in the production of the compositions of the invention and they are so well known that a detailed description of cement will not be given here; however, one can find such a detailed description in Encyclopedia of Chemical Technology, Volume 4, Second Edition, published by Kirk-Othmer, pages 684 to 710, of the type of cement which may be used in the production of this invention and which are incorporated herein by reference.

Blowing agents may be used to improve or increase the foaming to produce cellular solid plastics such as acetone, ethyl acetate, methanol, ethanol, halogenated alkanes, e.g., methylene chloride, chloroform, ethylidene chloride, vinylidene chloride, monofluorotrichloromethane, chlorodifluoromethane, butane, hexane or diethyl ether. Compounds which decompose at temperatures above room temperature with liberation of gases, e.g., nitrogen, such as azo compounds, or azoisobutyric acid nitrile, may also act as blowing agents. Compressed air may act as a blowing agent. Other examples of blowing agents and details of the use of flowing agents are described in Kunststoff-Handbuch, Volume VII, published by Vieweg and Hochtlen, Carl-Hanser-Verleg, Munich, 1966, e.g., on pages 108 and 109, 453 to 455 and 507 to 510.

The proportions of the components may be adjusted to produce a highly cellular solid. When water is used, it reacts with the NCO group to produce $CO_2$ and pores are produced in the product by the evolved $CO_2$. In certain cases, the $CO_2$ is rapidly evolved and escapes before the product hardens, and a solid product can be produced, nearly completely free of air cells. When a high silicate content, from 80% to 99% by weight, is desirable, such as when the final product is required to have mainly the properties of an inorganic silicate plastic, in particular, high-temperature resistance and complete flame resistance, an alkali metal silicate may be added with copolymer or polyol or may be reacted with the polyisocyanate to produce a polyurethane prepolymer. In that case, the function of the polyisocyanate is that of a non-volatile hardener whose reaction product is a high-molecular-weight polymer which reduces the brittleness of the product.

When an alkali catalyst or alkali metal silicate is used in the invention, fine metal powders, e.g., powdered calcium, magnesium, aluminum or zinc, may also act as the blowing agents by bringing about the evolution of hydrogen. Compressed air may be mixed in the components and may also be used to mix the components, then be used as the blowing agent. These metal powders also have a hardening and reinforcing effect.

The properties of the foams (cellular solid) obtained from any given formulation, e.g., their density in the moist state, depends to some extent on the details of the mixing process, e.g., the form and the speed of the stirrer and the form of the mixing chamber, and also the selected temperature at which foaming is started. The foams will usually expand 3 to 12 times their original volume.

The polyurethane plastics produced by the invention have many uses. The reaction mixture, with or without a blowing agent, may be mixed in a mixing apparatus; then the reaction mixture may be sprayed by means of compressed air or by the airless spraying process onto surfaces; subsequently, the mixture expands and hardens in the form of a cellular solid which is useful for insulation, filling, and moisture-proofing coating. The foaming material may also be forced, poured or injection-molded into cold or heated molds, which may be relief molds or solid or hollow molds, optionally by centrifugal casting, and left to harden at room temperature or at temperatures up to 200° C., at ambient pressure or at elevated pressure. In certain cases, it may be necessary to heat the mixing or spraying apparatus to initiate foaming; then, once foaming has started, the heat evolved by the reaction between components continues the foaming until the reaction is complete. A temperature between 40° C. and 150° C. may be required in order to initiate foaming. The blowing agent is usually added to the polyisocyanate.

Reinforcing elements may quite easily be incorporated into the reaction mixtures. The inorganic and/or organic reinforcing elements may be, e.g., fibers, metal wires, foams, fabrics, fleeces or skeletons. The reinforcing elements may be mixed with the reaction mixtures, for example, by the fibrous web impregnation or by processes in which the reaction mixtures and reinforcing fibers are together applied to the mold, for example, by means of a spray apparatus. The shaped products obtainable in this way may be used as building elements, e.g., in the form of sandwich elements, either as such or after they have been laminated with metal, glass or plastics; if desired, Reinforcing elements may quite easily be incorporated into the reaction mixtures. The inorganic and/or organic reinforcing elements may be, e.g., fibers, metal wires, foams, fabrics, fleeces or skeletons. The reinforcing elements may be mixed with the reaction mixtures, for example, by the fibrous web impregnation or by processes in which the reaction mixtures and reinforcing fibers are together applied to the mold, for example, by means of a spray apparatus. The shaped products obtainable in this way may be used as building elements, e.g., in the form of sandwich elements, either as such or after they have been laminated with metal, glass or plastics; if desired, these sandwich elements may be foamed. The products may be used as hollow bodies, e.g., as containers for goods which may be required to be kept moist or cool, as filter materials or exchanges, as catalyst carriers or carriers of other active substances, as decorative elements, furniture components and fillings or for cavities. They may be used in the field of model building and mold building, and the production of molds for metal casting may also be considered.

Instead of blowing agents, finely divided inorganic or organic hollow particles, e.g., hollow expanded beads of glass, plastics and straw, may be used for producing cellular solid products. These products may be used as insulating materials, cavity fillings, packaging materials, building materials which have good solvent resistance and advantageous fire-resistant characteristics. They may also be used as lightweight building bricks in the form of sandwiches, e.g., with metal-covering layers for house building and the construction of motor vehicles and aircraft.

Organic or inorganic particles which are capable of foaming up or have already been foamed may be incorporated in the fluid foaming reaction mixture, e.g., expanded clay, expanded glass, wood, cork, popcorn, hollow plastic beads such as beads of vinyl chloride polymers, polyethylene, styrene polymers, or foam particles of these polymers or other polymers, e.g., polysulphone, polyepoxide, polyurethane, poly(urethane silicate) copolymers, urea-formaldehyde, phenol-formaldehyde or polyimide polymers, or, alternatively, heaps of these particles may be permeated with foaming reaction mixtures to produce insulation materials which have good fire-resistant characteristics.

The cellular solid products of the invention, in the aqueous or dry or impregnated state, may subsequently be lacquered metallized, coated, laminated, galvanized, vapor-treated, bonded or blocked. The cellular solid products may be sawed, drilled, planed, polished, or other working processes may be used to produce shaped products. The shaped products, with or without a filler, may be further modified in their properties by subsequent heat treatment, oxidation processes, hot pressing, sintering processesor surface melting or other compacting processes.

The novel cellular solid products of the invention are also suitable for use as constructional materials due to their toughness and stiffness, yet they are still elastic. They are resistant to tension and compression and have a high-dimensional stability to heat and have high flame resistance. They have excellent sound-absorption capacity, heat-insulating capacity, fire resistance, and heat resistance which makes them useful for insulation. The cellular products of this invention may be foamed on the building site and, in many cases, used in place of wood or hard fiber boards. Any hollow forms may be used for foaming. The brittle foams may be crushed and used as a filler, as a soil conditioner, as a substrate for the propagation of seedlings, cuttings and plants or cut flowers.

The foamed or solid concrete produced by reaction of the organic broken-down lignin cellulose polymer, polyol and polyisocyanate with a water-binding component may be used as surface coatings having good adhesion and resistance-to-abrasion properties, as mortars, and for making molded products, particularly in construction engineering and civil engineering such as for building walls, igloos, boats and for roadbuilding, etc. These products are light-weight, thermal-insulating materials with excellent mechanical properties and fire resistance. The amount of water-binding component used varies greatly, depending on the type of product desired, from 1% to 200% by weight, based on reactants. In certain cases, it is desirable to add sand and gravel in the amount of 1 to 6 parts by weight to each part by weight of the hydraulic cement. The mixture may be poured in place, troweled on or sprayed onto the desired surface to produce a solid or cellular solid product.

Fillers in the form of powders, granules, wire, fibers, dumbbell-shaped particles, crystallites, spirals, rods, beads, hollow beads, foam particles, non-woven webs, pieces of woven or knitted fabrics, tapes and pieces of foil of solid inorganic or organic substances, e.g., dolomite, chalk, alumina, asbestos, basic silicic acids, sand, talc, iron oxides, aluminum oxide and hydroxides, alkali metal silicates, zeolites, mixed silicates, calcium silicate, calcium sulphates, aliminosilicates, cements, basalt wool or powder, glass fibers, carbon fibers, graphite, carbon black, Al-, Fe-, Cri- and Ag-powders, molybdenum sulphide, steel wool, bronze or copper meshes, silicon powder, expanded clay particles, hollow glass beads, glass powder, lava and pumice particles, wood chips, woodmeal, cork, cotton, straw, popcorn, coke or particles of filled or unfilled, foamed or unfoamed, stretched or unstretched organic polymers, may be added to the mixture of the Components A, B and C in many applications. Among the numerous organic polymers which may be used, e.g., as powders, granules, foam particles, beads, hollow beads, foamable (but not-yet-foamed) particles, fibers, tapes, woven fabrics, or fleeces, the following may be mentioned as examples: polystyrene, polyethylene, polypropylene, polyacrylonitrile, polybutadiene, polyisoprene, polytetrafluorethylene, aliphatic and aromatic polyesters, melamine, urea, phenol resins, phenol silicate resins, polyacetal resins, polyepoxides, polyhydantoins, polyureas, polyethers, polyurethanes, polyimides, polyamides, polysulphones, polycarbonates and copolymers thereof.

The composite materials, according to the invention, may be mixed with considerable quantities of fillers without losing their advantageous properties and, in particular, composite materials which consist predominantly of organic constituents which are preferably filled with inorganic fillers; where silicate constituents predominate, it is preferably filled with organic fillers. Fillers which are particularly preferred are chalk, talc, dolomite, gypsum, clay, anhydrite, glass, carbon and the conventional plastics and rubber waste.

In the production of surface coatings, bonds, putties or interlayers, particularly in the case of porous materials, it is preferred to use polyisocyanates which have only a low isocyanate content, e.g., less than 5%, or prepolymers which are free from isocyanate groups. The mixtures obtained in this way have a long pot life and may be applied in thin layers which gradually harden in the course of time. The liberated $CO_2$ acts as the curing agent. In a two-stage or multistage hardening in which, for example, an excess of water is used, there is a rapid evolution of $CO_2$ and the polyurethane silicon acid resinous product is converted into a workable form which may be used as putties, coating agents, grouting materials or mortar. This thermoplastic form may also be injection-molded, extruded or worked up in a kneader.

In many cases, the polyurethane silicate resinous and foamed products produced by the invention are soluble in organic solvents and may be used as a tough coating agent for wood and metal. The mixtures of the invention are also suitable for use as impregnating agents for finishing fibers. The mixtures may also be extruded through dies and slots and be converted into fibers and foils. These fibers and foils may be used for producing synthetic incombustible paper or fleeces.

When the organic alkali metal silicate compounds and polyisocyanate are combined with expanded clay and an alkali metal silicate solution, a very good concrete is obtained which can, for example, be used as panels in the construction field. In this case, the foam material (expanded clay) plays the part of the binding material.

Organic compounds such as organic epoxides, epihalohydrins, halohydrins, allyl halides and mixtures thereof may be added with the substituted organic compound and reacted with the oxidated silicon compound to produce organic alkali metal silicate compounds or may be reacted with the organic alkali metal silicate compounds.

In an additional step, up to 100 parts by weight of an organic epoxide compound are added with the 50 to 100 parts by weight of an oxidated compound, 50 to 100 parts by weight of an alkali metal compound in an aqueous solution, preferably in a concentration of 10% to 70% solids, and a substituted organic compound, in an amount up to where the substituted radicals equal the alkali metal radicals, are added to a closed system at a temperature up to 200° C. and a pressure up to 1500 psi while agitating for 1 to 12 hours, thereby producing organic polyhydroxy alkali metal silicate compounds. These organic polyhydroxy alkali metal silicate compounds will react with polyisocyanates or polycarboxylic acids and/or polycarboxylic acid anhydrides to produce resinous products, which may be used as coating agents, molding powder, adhesive, etc., or polyurethane silicate foams which may be utilized as thermal and sound insulation, floatation construction components, packaging, etc.

In an additional step, 50 parts by weight of the organic alkali metal silicate compounds are mixed with up to 200 parts by weight of a water-binding agent, and sufficient water, up to 100 parts by weight, is added and mixed at ambient temperature and pressure; then the resultant mixture is allowed to cure, thereby producing an organic alkali metal silicate reinforced concrete. This concrete may be cured in molds to produce useful construction components, art objects, boats, etc.

In an additional step, 50 to 100 parts by weight of a polyepoxy resin and 10 to 50 parts by weight of an organic polyamine are mixed and reacted at ambient temperature and pressure, thereby producing an epoxy alkali metal silicate resinous product. This resinous product may be applied to fiberglas in a mold to produce boats, furniture, auto bodies, etc.

In an additional step, 50 to 100 parts by weight of the organic alkali metal silicate compounds, 50 to 100 parts by weight of an organic polycarboxylic acid compound and 50 to 100 parts by weight of an organic polyhydroxy compound are mixed, then heated to just below the boiling temperature of the reactants while agitating for 30 minutes to 12 hours, thereby producing a polyester alkali metal silicate resinous product. The salt-forming compound, such as a mineral acid, may be added to the mixture until the pH is 6 to 8 before heating, then the mixture may be heated for 30 minutes to 12 hours at ambient pressure and at a temperature just below the boiling temperature of the mixture while agitating, thereby producing a polyester silicate resinous product. Polycarboxylic acid anhydrides may be used in place of polycarboxylic acid, or mixtures of polycarboxylic acids and polycarboxylic acid anhydrides may be used. The polyols and polycarboxylic acids and acid anhydrides were previously listed in this invention.

In an additional step, 50 to 100 parts by weight of the organic alkali metal silicate, 50 to 100 parts by weight of a vinyl monomer or a mixture of vinyl monomers and a catalytic amount of an initiator, such as a peroxide initiator, are mixed and reacted by agitating the mixture at a temperature between −4° C. and the boiling temperature of the mixture and at ambient pressure and 1500 psi for 1 to 12 hours, thereby producing a poly(vinyl organic alkali metal silicate) polymer. This polymer may be used as a coating agent on wood and metal, or may be softened under heat and pressure and molded into useful objects such as panels, knobs, handles, etc.

In an additional step, an allyl halide is added with the substituted organic compound up to an amount by weight equal to the weight of the substituted compound and selected from the group consisting of allyl chloride, methyl allyl chloride and mixtures thereof, thereby producing an organic allyl alkali metal silicate polymer. This polymer may be utilized as a coating agent for wood, metal, concrete, etc.

In an additional step, an epihalohydrin is added with the substituted organic compound in an amount by weight up to the amount of the substituted organic compound and selected from the group consisting of epichlorohydrin, epibromohydrin, methyl epichlorohydrin, di-epi-iodohydrin, epifluorohydrin, epiiodohydrin and mixtures thereof, thereby producing organic epoxy alkali metal silicate compounds. The organic epoxy alkali metal silicate compounds may be cured by mixing with up to 100% by weight of a polyamine compound or resinous product, percentage based on weight of an organic epoxy alkali metal silicate compound, then applied to fiberglas in a mold to produce furniture, boats, containers, construction panels, etc.

In an additional step, an alkylene halohydrin is added with the substituted organic compound in an amount by weight up to the amount of the substituted organic compound and selected from the group consisting of ethylene chlorohydrin, ethylene bromohydrin, glycerol monohydrin, and mixtures thereof, thereby producing organic hydroxy alkali metal silicate compounds. The organic hydroxyl alkali metal silicate compounds may be reacted with organic polyisocyanates and polycarboxylic acid compounds and/or polycarboxylic acid anhydrides to produce resinous products which may be utilized as coating agents for wood and metal, as adhesives, as putty, as caulking compound, etc.; and foams may be produced which may be used as thermal or sound insulation, for floatation in boats, and for packaging, building components, art objects, etc.

Epihalohydrin may be used in this invention in an amount up to 100 parts by weight and selected from the group consisting of epichlorohydrin, epibromohydrin, methyl epichlorohydrin, di-epi-iodohydrin, epifluorohydrin, epi-iodohydrin and mixtures thereof. Epichlorohydrin is the preferred epihalohydrin.

Organic oxides may be used in this invention, such as ethylene oxide, propylene oxide, butylene oxide, styrene oxide, tetrahydrofuran and mixtures thereof, up to 100 parts by weight.

Allyl halide compounds may be used in this invention. Any suitable allyl halide may be used such as allyl chloride, allyl bromide, methyl allyl chloride, methyl allyl bromide and mixtures thereof. The allyl halide compounds may be added in an amount by weight up to 100 parts.

Alkene halohydrins may be used in this invention. Any suitable alkene halohydrin such as ethylene chlorohydrin, ethylene bromohydrin, glyceryl monochlorohydrin and others, and mixtures thereof, may be used. The alkene halohydrin may be added in an amount by weight up to 100 parts.

Any suitable polyepoxy resin may be used in this invention. The polyepoxy resin should contain at least two vicinal epoxy groups, i.e.,

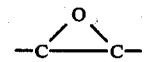

groups per molecule. The most common or conventional epoxy resins are obtained by reacting epichlorohydrin with a polyhydroxyl compound, such as Bisphenol A, in the presence of a catalyst. Various examples of polyepoxides that may be used in this invention are given in U.S. Pat. No. 2,633,458 and it is to be understood that so much of the disclosure of that Patent relative to examples of polyepoxy resins is incorporated by reference into this specification. The glycidyl ethers of polyhydric phenols are preferred.

Any suitable organic polyamine may be used in this invention. Suitable organic polyamines should possess a plurality of amino hydrogen, i.e., a plurality of

groups wherein N is an amino nitrogen. These include the aliphatic, cycloaliphatic, aromatic or heterocyclic polyamines as well as derivatives thereof, as long as the derivatives still contain the necessary amino hydrogen. The aliphatic polyamines are preferred which comprise the polyethylene polyamines of the formula:

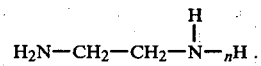

$$H_2N-CH_2-CH_2-N-_nH$$
(with H above N)

Diethylenetriamine is preferred.

DESCRIPTION OF PREFERRED EMBODIMENTS

My invention will be illustrated in greater detail by the specific Examples which follow, it being understood that these preferred embodiments are illustrative of, but not limited to, procedures which may be used in the production of organic alkali metal silicate compounds and resinous products. Parts and percentages are by weight unless otherwise indicated.

EXAMPLE 1

About 100 parts by weight of fine granular hydrated silica and 50 parts by weight of sodium hydroxide in 200 parts by weight of water are mixed, then 50 parts by weight of ethylene chloride are added at ambient temperature and pressure, then agitated for 1 to 12 hours, thereby producing a solid white mixture of ethyl hydroxy alkali metal silicate compound.

EXAMPLE 2

About 100 parts by weight of an aqueous sodium silicate solution containing about 40% sodium silicate (8.9% $Na_2O$ and 28.7% $SiO_2$) and 25 parts by weight of sodium hydroxide are mixed, then 25 parts by weight of methylene chloride are added at ambient temperature and pressure while agitating for 1 to 12 hours, thereby producing a mixture of white, solid methyl hydroxy alkali metal silicate compound.

EXAMPLE 3

About 100 parts by weight of an aqueous sodium silicate solution containing about 50% sodium silicate (19.7% $Na_2O$ and 31.5% $SiO_2$), 25 parts by weight of sodium hydroxide, 25 parts by weight of benzene chloride and 3 parts by weight of sodium salt of fatty acids are mixed, then agitated while heating to just below the boiling temperature of the reactants for 1 to 12 hours, thereby producing white-colored granules of benzene alkali metal silicate compound.

EXAMPLE 4

About 100 parts by weight of an aqueous sodium silicate solution containing 40% sodium silicate (18% $Na_2O$ and 36% $SiO_2$), 25 parts by weight of sodium hydroxide, 20 parts by weight of chloroform and 3 parts by weight of sodium recinoleic sulphonate are mixed and agitated at ambient temperature and pressure for 1 to 12 hours, thereby producing a white, solid methyl hydroxy alkali metal silicate compound and sodium chloride.

EXAMPLE 5

About 100 parts by weight of an aqueous sodium silicate solution containing about 55% sodium silicate (19.7% $Na_2O$ and 31.5% $SiO_2$), 30 parts by weight of lye (NaOH) and 20 parts by weight of trichlorotrifluoroethane are mixed and agitated at ambient temperature and pressure for 1 to 12 hours, thereby producing a white granular mixture of haloethane sodium silicate compounds.

EXAMPLE 6

About 100 parts by weight of an aqueous potassium metasilicate containing 40% potassium metasilicate and 25 parts by weight of potassium hydroxide are mixed, then 20 parts by weight of 1,2-dichloroethylene are added, then agitated at ambient temperature and pressure for 1 to 12 hours, thereby producing a white, granular mixture of ethyl hydroxy alkali metal silicate and chloroethyl alkali metal silicate compounds and sodium chloride.

EXAMPLE 7

About 100 parts by weight of an aqueous sodium metasilicate solution containing about 35% sodium metasilicate and 25 parts by weight of sodium hydroxide are mixed, then 20 parts by weight of ethyl hydrogen sulfate are slowly added at ambient temperature and pressure while agitating for 1 to 2 hours, thereby producing ethyl sodium silicate and diethyl sodium silicate, each a white, granular compound.

EXAMPLE 8

About 100 parts by weight of an aqueous sodium silicate solution containing about 40% sodium silicate (9.15% $Na_2O$ and 29.5% $SiO_2$) and 20 parts by weight of sodium hydroxide are mixed, then 15 parts by weight of ethyl oxalate are slowly added while agitating at ambient temperature and pressure for 1 to 12 hours, thereby producing ethyl sodium silicate and diethyl sodium silicate compounds.

EXAMPLE 9

About 100 parts by weight of an aqueous sodium silicate solution containing about 45% sodium silicate (18% $Na_2O$ and 36% $SiO_2$) and 25 parts by weight of caustic soda (NaOH) are mixed, then 20 parts by weight of bis(2-chloroethyl) ether are added, then agitated at ambient temperature and pressure for 1 to 12 hours, thereby producing organic alkali metal silicate compounds and sodium chloride.

EXAMPLE 10

About 100 parts by weight of an aqueous sodium silicate solution containing about 40% sodium silicate (18% $Na_2O$ and 36% $SiO_2$), 20 parts by weight of sodium hydroxide, 3 parts by weight of sodium salt of adipic acid and 15 parts by weight of para-dinitrobenzene are mixed, then agitated at a temperature just below the boiling temperature of the mixture and at ambient pressure for 1 to 12 hours, thereby producing a mixture of benzene hydroxy alkali metal silicate compounds.

EXAMPLE 11

About 100 parts by weight of an aqueous sodium silicate solution containing about 40% sodium silicate (14.7% $Na_2O$ and 29.4% $SiO_2$) and 25 parts by weight of sodium hydroxide are mixed, then about 15 parts by weight of butane-1,4-di(hydrogen sulfate) are slowly added at a temperature below the boiling point of the mixture and at ambient pressure while agitating for 1 to 12 hours, thereby producing a mixture of organic alkali metal silicate compounds and sodium hydroxide.

Other disubstituted organic compounds may be used in place of butane-1,4-di(hydrogen sulfate) such as para dichlorobenzene; 2,4-dinitrotoluene; chloroform; 1,3-dichloro-2-propanol; bis(2-chloroethyl) formal; 1,3-dibromopropane; methylene chloride; 1,4-dibromo-2-butene; 1,3-chloromethoxy-2,2-di-methyl propane; dichloroethyl carbonate; 2,4-dinitrobenzene sulfonic acid; pp'-dichlorobenzyl and mixtures thereof.

EXAMPLE 12

About 100 parts by weight of an aqueous sodium silicate solution containing about 40% sodium silicate (14.7% $Na_2O$ and 29.4% $SiO_2$) and 25 parts by weight of caustic soda (NaOH) are mixed, then 10 parts by weight of ethylene chloride and 10 parts by weight of benzyl chloride are added and agitated at a temperature just below the boiling temperature of the mixture for 1 to 12 hours, thereby producing organic alkali metal silicate compounds.

Other substituted organic compounds may be used in place of ethylene chloride and benzyl chloride such as ethylene dibromide, propylene dichloride, propylene dibromide, dihalides of unsaturated hydrocarbon gases derived from pressure-cracking processes or natural gas-cracking processes, polyhalide alkanes such as 1,1,2-trichloroethane; 1,2,4-trichlorobutane; trichloromesitylene; compounds containing disubstituted halogens, acid sulfates, nitrates, acid phosphates, bicarbonates, formates, acetates, propionates, laurate, oleate, stearate, oxalate, acid malonate, acid tartrate, acid citrate and mixtures thereof such as: AA' disubstituted ethyl ether, BB' disubstituted ethyl ether, disubstituted methyl ether, disubstituted ethoxy ethyl ether, disubstituted thio ethyl, disubstituted 1,3-methoxy-2,2-dimethyl propane; disubstituted dipropyl formal, disubstituted para-diethoxy benzene, disubstituted dimethoxy ethane, disubstituted diethyl carbonate, disubstituted glycol diacetate, pp' disubstituted dibenzyl ether, pp' disubstituted diphenyl ether, disubstituted diethyl sulphone, AA' disubstituted propyl ether, para-disubstituted benzene, disubstituted para-xylene, pp' disubstituted dibenzyl, disubstituted para hexyl propyl benzene, disubstituted 3-toyl propene-2, and mixtures thereof.

EXAMPLE 13

About 100 parts by weight of an aqueous sodium silicate solution containing about 30% sodium silicate (18% $Na_2O$ and 36% $SiO_2$) and 25 parts by weight of sodium hydroxide are mixed in an autoclave, then ethyl chloride gas is slowly added to the solution under 500 to 1500 psi in an amount wherein the chloride atoms are about equal to the sodium atoms in the sodium hydroxide, while vigorously agitating for 1 to 12 hours at a temperature of 150° C. to 200° C., thereby producing a mixture of ethyl sodium silicate and diethyl sodium silicate and sodium chloride.

EXAMPLE 14

About 100 parts by weight of an aqueous sodium silicate solution containing about 30% sodium silicate (14.9% $Na_2O$ and 29.4% $SiO_2$) and 25 parts by weight of sodium hydroxide are mixed in an autoclave, then propyl chloride is slowly added to the solution, in an amount wherein the chlorine atoms are about equal to the sodium atoms, while vigorously agitating at a pressure of 500 to 1500 psi and at a temperature of 150° C. to 200° C. for 1 to 12 hours, thereby producing a mixture of propyl sodium silicate and dipropyl sodium silicate compounds and sodium chloride.

EXAMPLE 15

About 100 parts by weight of an aqueous sodium silicate solution containing about 30% sodium silicate (18% $Na_2O$ and 36% $SiO_2$), 3 parts by weight of sodium salt of fatty acids and 30 parts by weight of sodium hydroxide are mixed in an autoclave, then methyl chloride, in an amount wherein the chlorine atoms are about equal to the sodium atoms in sodium hydroxide, are slowly added at 1000 to 1500 psi while agitating at 150° C. to 200° C. for 1 to 12 hours, thereby producing a mixture of methyl sodium silicate and dimethyl sodium silicate and sodium chloride.

EXAMPLE 16

About 100 parts by weight of an aqueous sodium silicate solution containing about 35% sodium silicate (18% $NaO_2$ and 36% $SiO_2$) and 20 parts by weight of sodium hydroxide are mixed, then 30 parts by weight of ethyl acetate are added and agitated at a temperature between ambient and the boiling point of the mixture for 1 to 12 hours, thereby producing organic alkali metal silicate compounds and sodium acetate.

Other substituted compounds may be used in place of ethyl acetate such as methyl acetate; propyl acetate; propane-1-dihydrogen phosphate; bis-monochloroacetic acid; nitrobenzene; 1-chloro-2-propanol; methyl sulfate; ethyl oxalate; 1,1-bromopropane; ethyl sulfate; 1-bromo-2-butene; ethylene chlorohydrin; ethyl hydrogen sulfate; dichloroacetic acid; p-chlorobenzyl and mixtures thereof.

EXAMPLE 17

Hydrochloric acid is added to the ethyl hydroxy alkali metal silicate compounds of Example 1 while agitating at ambient temperature and pressure until the pH is between 6 and 8, thereby producing ethyl hydroxy silicate compounds and salt. The salt is removed by washing with water and filtering.

EXAMPLE 18

Dilute sulfuric acid is added to the methyl hydroxy alkali metal silicate compounds produced in Claim 2 while agitating at ambient temperature and pressure until the pH is between 6 and 8, thereby producing methyl hydroxy silicate compounds and sodium sulfate. The mixture is washed with water and salt is filtered off.

EXAMPLE 19

Sodium hydrogen sulfate is added to the benzene alkali metal silicate produced in Claim 3 while agitating at ambient temperature and pressure until the pH is between 6 and 8, thereby producing benzene silicate and salt. The salt is removed by washing with water and filtering off.

EXAMPLE 20

Dilute hydrochloric acid is added to the organic alkali metal silicate compounds, listed below, while agitating until the pH is 6 to 8, thereby producing an organic silicate compounds and sodium chloride. The salt is removed by washing with water and the water and salt are filtered off. The organic silicate compounds are dried.

| Example | Organic alkali metal silicate | Produced in Example |
|---|---|---|
| a | Methyl hydroxy alkali metal silicate | 4 |
| b | Haloethane sodium silicate compounds | 5 |
| c | Chloroethyl alkali metal silicate compound | 6 |
| d | Ethyl sodium silicate compounds | 7 |
| e | Organic alkali metal silicate compound | 9 |
| f | Ethyl hydroxy alkali metal silicate | 12 |

EXAMPLE 21

About 100 parts by weight of an aqueous sodium silicate solution containing about 35% sodium silicate (18% $Na_2O$ and 36% $SiO_2$) and 25 parts by weight of sodium hydroxide are mixed, then 20 parts by weight of ethylene chloride and 20 parts by weight of propylene oxide are added, then agitated at ambient temperature and pressure for 1 to 12 hours, thereby producing white granular mixture of polyhydroxyethylenepropylene ether alkali metal silicate and sodium chloride.

EXAMPLE 22

Dilute hydrochloric acid is slowly added to the polyhydroxyethylenepropylene ether alkali metal silicate produced in Example 21 until the pH is 6 to 8, thereby producing a liquid polyhydroxyethylenepropylene ether silicate.

The polyhydroxyethylenepropylene ether silicate will react with polyisocyanates to produce foams which may be used for thermal and sound insulation.

EXAMPLE 23

About 100 parts by weight of an aqueous sodium silicate solution containing about 30% sodium silicate (18% $Na_2O$ and 36% $SiO_2$) and 20 parts by weight of sodium hydroxide are mixed, then 25 parts by weight of ethylene chloride are added and mixed in an autoclave; about 20 parts by weight of ethylene oxide are added at about 60 psi and 120° C. to 135° C. while agitating for 1 to 12 hours, thereby producing polyhydroxy ethylene ether silicate polymers.

Other epoxide compounds may be used with, or in place of, ethylene oxide such as propylene oxide, epichlorohydrin, epibromohydrin and mixtures thereof.

The polyhydroxy ethylene ether silicate may be mixed with about equal parts by weight of MDI, optionally a blowing agent, curing agent, initiator, and foam regulator to produce polyurethane silicate foams which may be used for thermal and sound insulation.

EXAMPLE 24

About equal parts by weight of crude MDI (PAPI produced by Upjohn) and the organic alkali metal silicate as produced in Example 1 are mixed and reacted, thereby producing a polyurethane silicate resinous product in 1 to 5 minutes.

EXAMPLE 25

About 3 parts by weight of tolylene diisocyanate (TDI) and 5 parts by weight of the organic alkali metal silicate compounds as produced in Example 2 are mixed; the mixture begins to expand in 15 to 60 seconds, thereby producing a semi-flexible polyurethane foam.

EXAMPLE 26

About 40 parts by weight of MDI (PAPI 27), 50 parts by weight of the organic alkali metal silicate compounds as produced in Example 3, 2 parts by weight of triethylenediamine, 0.01 part by weight of tin oxalate, 1 part by weight of a silicone surfactant (L-5340 produced by Union Carbide) and 10 parts by weight of trichlorotrifluoroethane are mixed thoroughly at ambient temperature, the mixture beginning to expand in 15 to 45 seconds, thereby producing a flexible polyurethane silicate foam of 1.5 to 2 pounds per cubic foot.

EXAMPLE 27

About 30 parts by weight of crude MDI, 10 parts by weight of TDI, 50 parts by weight of an organic alkali metal silicate selected from below, 20 parts by weight of a polyol selected from below, 0.5 part by weight of triethylamine, 1 part by weight of triethylenediamine, 0.01 part by weight of tin oxalate, 1 part by weight of a silicone surfactant (L-5340 produced by Union Carbide) and 10 parts by weight of trichlorotrifluoroethane are mixed thoroughly at about 26° C. The mixture begins to expand in 15 to 60 seconds, thereby producing a polyurethane silicate foam.

| Example | Polyol | Organic alkali metal silicate produced in Example |
|---|---|---|
| a | Polyethylene triol (POLY G 30-56 produced by Olin) | 1 |
| b | Polypropylene glycol (mol. wt. 1000) | 2 |
| c | Polyethylene triol (mol. wt. 1200) | 3 |
| d | Sucrose amine polyol (POLY G 71-356) | 4 |
| e | Polypropylene triol (NIAX LHT 240 by Union Carbide) | 23 |
| f | Polyethylene glycol (mol. wt. 600) | 14 |

EXAMPLE 28

About 50 parts by weight of crude MDI, 50 parts by weight of the organic alkali metal silicate compounds as produced in Example 1, 0.2 part by weight of triethylamine and 100 parts by weight of Portland cement are thoroughly mixed, thereby producing a rigid polyurethane silicate concrete product.

EXAMPLE 29

About 50 parts by weight of crude MDI, 50 parts by weight of the polyhydroxy ethylene ether silicate polymer, 100 parts by weight of Portland cement, 2 parts by weight of triethylenediamine, 10 parts by weight of trichlorotrifluoroethane and 0.01 part by weight of tin octate are thoroughly mixed. The mixture begins to expand in 30 to 120 seconds, thereby producing a rigid polyurethane silicate concrete foam.

EXAMPLE 30

About 50 parts by weight of the dry ethyl hydroxy silicate compounds as produced in Example 17, 50 parts by weight of MDI (PAPI 27), 10 parts by weight of trichlorotrifluoroethane, 0.01 part by weight of tin octate and 2 parts by weight of triethylenediamine are thoroughly mixed. The mixture begins to expand in 15 to 60 seconds, thereby producing a semiflexible polyurethane silicate foam.

EXAMPLE 31

About 50 parts by weight of the organic alkali metal silicate as produced in Example 1 and 100 parts by weight of Portland cement are mixed. The mixture hardens in 1 to 12 hours, thereby producing an organic concrete product.

Other water-binding agents may be used in place of Portland cement such as other hydraulic cements, gypsum, burnt lime and synthetic anhydrite.

The organic concrete products may be poured and cured in molds such as building blocks, building panels, etc., or sprayed on walls and used as reinforced stucco.

EXAMPLE 32

About 50 parts by weight of organic alkali metal compounds as produced in one of the Examples listed below, 50 parts by weight of ethylene glycol and 75 parts by weight of phthalic anhydride are mixed, then heated to just below the boiling point of the reactants for 1 to 12 hours, thereby producing a polyester alkali metal silicate resinous product.

| Example | Organic alkali metal compounds as produced in |
|---|---|
| a | Example 1 |
| b | Example 2 |
| c | Example 3 |
| d | Example 4 |
| e | Example 5 |
| f | Example 6 |
| g | Example 7 |
| h | Example 8 |
| i | Example 9 |
| j | Example 10 |
| k | Example 11 |
| l | Example 12 |
| m | Example 13 |
| n | Example 14 |

Other organic polyhydroxyl compounds (polyols) may be used in place of ethylene glycol such as propylene glycol, glycerol, butylene glycol, diethylene ether glycol, polyethylene glycol, polypropylene glycol and mixtures thereof.

Other polycarboxylic acid compounds or polycarboxyl acid anhydrides may be used, such as succinic acid, adipic acid, sebacic acid, suberic acid, azelaic acid, phthalic acid, isophthalic acid, tetrahydrophthalic acid anhydride, trimellitic acid, hexahydrophthalic acid anhydride, fumaric acid, maleic acid, maleic acid anhydride, dimeric and trimeric fatty acids and mixtures thereof.

The polyester alkali metal silicate resinous products may be produced in the form of aqueous emulsions or in form of solutions in organic solvents and used as coating agents for wood, metal or plastics. The polyester alkali metal silicate resinous product may also be softened or melted with heat, then forced into a mold to produce useful products such as knobs, handles, toys, art objects, etc.

EXAMPLE 33

About 100 parts by weight of organic alkali metal silicate compounds, as produced in one of the listed Examples below, 50 parts by weight of diethylene glycol, 10 parts by weight of phthalic anhydride and 90 parts by weight of maleic anhydride are mixed, then heated to just below the boiling temperature of the reactants for 30 minutes to 12 hours at ambient pressure while agitating, thereby producing an unsaturated polyester alkali metal silicate resinous product.

| Example | Organic alkali metal silicate of |
|---|---|
| a | Example 1 |
| b | Example 2 |
| c | Example 3 |
| d | Example 4 |
| e | Example 5 |
| f | Example 6 |
| g | Example 7 |
| h | Example 8 |
| i | Example 9 |
| j | Example 10 |
| k | Example 11 |
| l | Example 12 |
| m | Example 13 |
| n | Example 14 |

Other unsaturated polycarboxylic acids or polycarboxylic anhydrides may be used in place of maleic anhydride such as maleic acid, itaconic acid, fumaric acid and mixtures thereof. Allyl esters may be used in place of the unsaturated polycarboxylic acids or used with the unsaturated polycarboxylic acids and acid anhydrides such as the reaction products of allyl alcohol of dibasic acids such as diethylene glycol bis (allyl carbonate), diallyl maleate, diallyl fumarate, diallyl phthalate, diallyl benzene phosphonate, allyl itaconate, methallyl methacrylate, and mixtures thereof.

EXAMPLE 34

About 100 parts by weight of the unsaturated polyester alkali metal silicate resinous product, as produced in Example a of Example 33, are mixed with 40 parts by weight of a vinyl monomer, styrene, thereby producing a solution; then an activator, cobalt naphthenate, is added until a concentration of 30 to 100 ppm is obtained and thoroughly mixed. A peroxide initiator, methyl ethyl ketone peroxide, is then added in a catalytic amount, 0.1 part by weight, and thoroughly mixed. The mixture is then applied to layers of fiberglas and hardens in 30 minutes to 12 hours, thereby producing a construction panel of polyester alkali metal silicate. The other unsaturated polyester alkali metal silicate resinous products produced in Example 33 may be used in place of that product produced in Example 33 a.

Other polymerizing monomers may be used in place of styrene such as triallyl cyanurate, allyl esters, acrylic acid monomers, acrylate monomers, acrylonitrite, vinyl acetate, vinyl toluene, divinyl benzene, methacrylonitrite and the like, and mixtures thereof.

Other initiators may be used in place of methyl ethyl ketone peroxide such as acetyl benzoyl peroxide, benzoyl peroxide, cyclohexanone peroxide, 2,4-dichlorobenzoyl peroxide, cumene hydroperoxide, lauroyl peroxide, acyl peroxides and the like, and mixtures thereof.

EXAMPLE 35

About 100 parts by weight of an organic alkali metal silicate, selected from the Examples listed below, 100 parts by weight of a glycidyl ether of Bisphenol A and 50 parts by weight of a polyamine, reaction product of diethylenetriamine and adipic acid, are thoroughly mixed, then applied to layers of fiberglas in the form of a construction panel. The mixture hardens in 30 minutes to 12 hours, thereby producing an epoxy alkali metal silicate construction panel.

| Example | Organic alkali metal silicate compounds as produced in |
|---|---|
| a | Example 1 |
| b | Example 2 |
| c | Example 3 |
| d | Example 4 |
| e | Example 5 |
| f | Example 6 |
| g | Example 7 |
| h | Example 8 |
| i | Example 9 |
| j | Example 10 |
| k | Example 11 |
| l | Example 12 |
| m | Example 13 |
| n | Example 14 |

Other organic polyepoxy resins may be used in place of the glycidyl ether of Bisphenol A such as epoxidized unsaturated organic compounds, epoxidized polyhydroxy compounds, epoxidized fatty acids, phenoxy resins, and epoxidized vegetable oils and the like and mixtures thereof.

Other polyamines may be used in place of the reaction product of diethylenetriamine and adipic acid such as aliphatic polyamines, cycloaliphatic polyamines, aromatic polyamines, heterocyclic polyamines and the like and mixtures thereof.

EXAMPLE 36

About 100 parts by weight of the organic alkali metal silicate produced in Example 1 and 25 parts by weight of diethylenetriamine are mixed, then 50 parts by weight of epichlorohydrin are slowly added while agitating and keeping the temperature below 50° C. for 1 to 12 hours, thereby producing an epoxy silicate resinous product.

Other epihalohydrins may be used in place of epichlorohydrin.

EXAMPLE 37

About 100 parts by weight of an organic alkali metal silicate compound, selected from the compounds produced in the Examples listed below, 100 parts by weight of a vinyl monomer listed below, 0.5 part by weight of benzoyl peroxide and 0.01 part by weight of diethyl aniline are mixed at ambient temperature and pressure, then agitated for 1 to 12 hours, thereby producing a poly(vinyl organic alkali metal silicate) polymer.

| Example | Organic alkali metal silicate | Vinyl monomer |
|---|---|---|
| a | Example 1 | Styrene |
| b | Example 2 | Acrylonitrile |
| c | Example 3 | Acrylic acid |
| d | Example 4 | Methacrylic acid |
| e | Example 5 | Methyl methacrylate |
| f | Example 6 | Vinyl acetate |
| g | Example 7 | Vinylidine chloride |
| h | Example 8 | Vinyl toluene |

EXAMPLE 38

Example 37 is modified by adding 200 parts by weight of water, thereby producing an aqueous emulsion of poly(vinyl alkali metal silicate) polymer.

This emulsion may be painted on wood, metal or plastic to form a protective coating.

Other initiators may be used in place of benzoyl peroxide, such as alkali metal persulfates, other organic peroxides, redox systems and the like.

EXAMPLE 39

About 100 parts by weight of fine granular hydrated silica and 50 parts by weight of sodium hydroxide in 200 parts by weight of water are mixed, then 25 parts by weight of ethylene chloride and 25 parts by weight of allyl chloride are added and mixed at ambient temperature and pressure, then agitated for 1 to 12 hours, thereby producing a solid white allyl chloride ethyl hydroxy alkali metal silicate compound.

Other allyl halides may be used in place of allyl chloride such as allyl bromide, methyl allyl chloride, methyl allyl bromide and the like and mixtures thereof.

These products may be further reacted with polyisocyanates such as MDI to produce useful foams and resinous products. Alkali metal silicates may be used in place of hydrated silica.

EXAMPLE 40

About 100 parts by weight of fine granular hydrated silica, 50 parts by weight of sodium hydroxide in 200 parts by weight of water, 25 parts by weight of ethylene chloride and 25 parts by weight of epichlorohydrin are mixed, then agitated at a temperature between ambient and the boiling temperature of the reactants and at ambient pressure for 1 to 12 hours, thereby producing a polyepoxy ethylene alkali metal silicate resinous product.

Other epihalohydrins may be used in place of epichlorohydrins such as epibromohydrin, methyl epichlorohydrin, diepi-iodohydrin, epifluorohydrin, epiiodohydrin and mixtures thereof.

EXAMPLE 41

About 100 parts by weight of the polyepoxy ethylene alkali metal silicate resinous product produced in Example 40 and 25 parts by weight of diethylenetriamine are mixed, then spread between two boards and cured in 2 to 12 hours, thereby producing an epoxy organic silicate resinous product to be utilized as an adhesive.

EXAMPLE 42

About 100 parts by weight of sodium metasilicate pentahydrate, 50 parts by weight of sodium hydroxide in 200 parts by weight of water, 25 parts by weight of methylene chloride and 25 parts by weight of ethylene chlorohydrin are mixed at ambient temperature and pressure, then agitated at a temperature just below the boiling point of the reactants for 1 to 12 hours, thereby producing ethylene hydroxy methylene alkali metal silicate compounds.

Other halohydrins may be used in place of ethylene chlorohydrin such as ethylene bromohydrin, glycerol monochlorohydrin, and the like and mixtures thereof.

Ethylene hydroxy methylene alkali metal silicate compounds will react with polycarboxyl acids and polycarboxyl acid anhydrides to produce polyester alkali metal silicate resinous products which may be utilized as coating agents, adhesives, or be further reacted with polyisocyanates to produce useful foams and resinous products.

EXAMPLE 43

About 100 parts by weight of sodium silicate (16% Na$_2$O and 32% SiO$_2$) in 300 parts by weight of water, 30 parts by weight of sodium hydroxide, 10 parts by weight of ethylene chloride, 5 parts by weight of allyl chloride, 5 parts by weight of propylene oxide, 5 parts by weight of epichlorohydrin and 5 parts by weight of ethylene chlorohydrin are mixed, then agitated at ambient pressure and at a temperature just below the boiling point of the reactants for 1 to 12 hours, thereby producing organic alkali metal silicate compounds.

EXAMPLE 44

About 100 parts by weight of the organic alkali metal silicate as produced in Example 1, 5 parts by weight of allyl chloride, 5 parts by weight of epichlorohydrin, 5 parts by weight of propylene oxide and 5 parts by weight of ethylene chlorohydrin are mixed, then agitated at ambient pressure and at a temperature just below the boiling temperature of the reactants for 1 to 12 hours, thereby producing organic alkali metal silicate compounds.

EXAMPLE 45

About 100 parts by weight of the products produced in Example 44, 100 parts by weight of crude MDI, 20 parts by weight of trichlorotrifluoroethane and 1 part by weight of triethylene diamine are mixed, then poured into a large mold. The mixture expands to produce a rigid polyurethane silicate foam. The foamed product is then cut into sheets and used for sound and thermal insulation.

Although specific materials and conditions were set forth in the above examples, these were merely illustrative of preferred embodiments of my invention. Various other compositions, such as the typical materials listed above, may be used, where suitable. The reactive mixtures and products of my invention may have other agents added thereto to enhance or otherwise modify the reaction and products.

Other modifications of my invention will occur to those skilled in the art upon reading my disclosure. These are intended to be included within the scope of my invention, as defined in the appended Claims.

I claim:

1. The process for the production of foamed polyurethane silicate resinous product by the following steps:
   (a) mixing and reacting 5 to 100 parts by weight of an oxidated silicon compound selected from the group consisting of hydrated silica, sodium silicate, potassium silicate, natural oxidated silicon compounds containing free silicic acid acid radicals and mixtures thereof, 50 to 100 parts by weight of an alkali metal compound selected from the group consisting of alkali metal hydroxide, alkali metal carbonates and mixtures thereof in an aqueous solution and an organic compound which is attached to a substituent which will split off during the reaction is a substituted hydrocarbon which contains a substituent selected from the group consisting of halogen, acid sulfate, nitrate, acid phosphate, bicarbonate, formate, acetate, propionate, laurate, oleate, stearate, oxalate, acid malonate, acid tartrate, acid citrate and mixtures thereof in an amount wherein the substituted radicals are about equal to the alkali metal radicals thereby producing an organic alkali metal silicate; then
   (b) adding and mixing 50 to 100 parts by weight of an organic polyisocyanate and up to 50% by weight of a chemically inert blowing agent, boiling within the range of from $-25°$ C. to 80° C. and allowing the mixture to react thereby.
   (c) producing a foamed polyurethane silicate resinous product.

2. The process of claim 1 wherein an additional step is taken wherein a salt-forming compound, selected from the group consisting of inorganic acids, organic acids, hydrogen-containing salts of mineral acids and mixtures thereof, is added to the organic alkali metal silicate until the pH is from 6 to 7, thereby producing organic silicate compound in step (a) of claim 1.

3. The process of claim 1 wherein the organic polyisocyanate is selected from the group consisting of tolylene diisocyanate, phosgenated product of aniline-formaldehyde condensation and mixtures thereof.

4. The process of claim 1 wherein an additional step is taken wherein up to 200 parts by weight of a water-binding agent selected from this group consisting of hydraulic cement, gypsum, burnt lime and synthetic anhydrite is added to the organic alkali metal silicate or organic polyisocyanate.

5. The process of claim 1 wherein 1 to 50 parts by weight of a polyol is added to the organic alkali metal silicate compound in step (a) of claim 1.

6. The produce produced by the process of claim 1.

7. The process of claim 1 wherein up to 10% by weight of an activator selected from the group consisting of amines, organo-metallic compounds, silaamines and mixtures thereof, percentage being based on the weight of the reaction mixture, is added to the organic alkali metal silicate in step (a) of claim 1.

8. The process of claim 1 wherein up to 100 parts by weight of a curing agent selected from the group consisting of water, water-containing 10% to 70% sodium silicate or potassium silicate, water containing 20% to 70% by weight of silica sol, water containing 20% to 70% by weight of a water-binding agent and mixtures thereof are added to the organic alkali metal silicate in step (a) of claim 1.

9. The process of claim 1 wherein an isocyanate-terminated polyurethane prepolymer is used in place of the organic polyisocyanate.

* * * * *